(12) United States Patent
Lenzini et al.

(10) Patent No.: US 7,349,331 B2
(45) Date of Patent: Mar. 25, 2008

(54) PROCEDURE AND SYSTEM FOR SCHEDULING A SHARED RECOURSE BETWEEN MULTIPLE INFORMATION PACKET FLOWS

(75) Inventors: Luciano Lenzini, Turin (IT); Enzo Mingozzi, Turin (IT); Enrico Scarrone, Turin (IT); Giovanni Stea, Turin (IT)

(73) Assignee: Telecom Italia S.p.A., Milan (IT)

( * ) Notice: Subject to any disclaimer, the term of this patent is extended or adjusted under 35 U.S.C. 154(b) by 891 days.

(21) Appl. No.: 10/399,887

(22) PCT Filed: Oct. 19, 2001

(86) PCT No.: PCT/IT01/00536

§ 371 (c)(1),
(2), (4) Date: May 9, 2003

(87) PCT Pub. No.: WO02/35777

PCT Pub. Date: May 2, 2002

(65) Prior Publication Data

US 2004/0014470 A1 Jan. 22, 2004

(30) Foreign Application Priority Data

Oct. 23, 2000 (IT) ............... TO2000A1000

(51) Int. Cl.
*H04L 12/26* (2006.01)

(52) U.S. Cl. .............. 370/229; 370/412; 370/503

(58) Field of Classification Search ........ 370/412, 370/455, 452, 453, 229, 231, 232, 234, 230, 370/230.1, 233, 235

See application file for complete search history.

(56) References Cited

U.S. PATENT DOCUMENTS 5,291,491 A * 3/1994 Hutchison et al. .......... 370/453

(Continued)

OTHER PUBLICATIONS

Delay Analysis of the FDDI Synchronous Data Class by Genter et al. (IEEE 1990).

(Continued)

*Primary Examiner*—Chirag G. Shah
*Assistant Examiner*—Kan Yuen
(74) *Attorney, Agent, or Firm*—Andrew Wilford

(57) ABSTRACT

Each synchronous flow ($h=1, 2, N_s$) is associated to a respective synchronous capacity value ($H_h$) indicative of the maximum amount of time for which a synchronous flow can be served before relinquishing the token. Each asynchronous flow ($I=1, 2, N_A$) is, on the other hand, associated to a respective indicative value of the delay to be recovered so that the respective queue has the right to be served and to another value indicating the instant in which the server visited the respective queue in the pervious cycle. Each queue associated to a synchronous flow (h) is therefore served for a maximum amount of time that is equal to the aforesaid synchronous capacity value, while each queue associated to an asynchronous flow (i) is only served if the server's visit takes place with anticipation with respect to the expected instant. This anticipation is determined as the difference between the expected rotation time, needed by the server (10) to complete a visit cycle (T) of the queues associated to the aforesaid flows (h, i), and the time that has passed since the server's previous visit (10) and the delay accumulated. This difference, if positive, defines the maximum service time for the asynchronous queue. If the queue is empty when the server visits it, the server (10) moves on to the next queue even before the relative maximum service time has passed.

15 Claims, 1 Drawing Sheet

U.S. PATENT DOCUMENTS

| | | | | |
|---|---|---|---|---|
| RE35,001 E | * | 7/1995 | Grow | 370/452 |
| 5,602,852 A | * | 2/1997 | Shiobara | 370/455 |
| 6,240,094 B1 | * | 5/2001 | Schneider | 370/412 |
| 6,377,548 B1 | * | 4/2002 | Chuah | 370/233 |
| 6,917,586 B1 | * | 7/2005 | Mauger et al. | 370/230 |

OTHER PUBLICATIONS

Performance Comparison of FDDI Models by Sadiku et al. (IEEE 1997).

Garanteeing Synchronous Messages With Arbitary Deadline Constraints . . . Malcolm et al.(IEEE 1993).

Performance Analysis of Token Rings as High Speed Backbone Network by Weelzel (IEEE 1990).

"Delay Analysis of FDDI Synchronous Data Class" by Genter & Vastola.

"Performance Compaerisn of FDDI Models" by Sadiku & Dempo.

"On Non-Existence of Optimal Local Synchronous Bandwidth Allocation Schemes . . . " by Han, Shin, & Hou.

"An Integrated Service Token Ring LAN Using Distributed Priority Change Method" by Yoneda & Matsushita.

"Optimal Synchronous Capacity Allocation for hard Real-Time Comuinications . . . " by Chen, Agrawal & Zhao.

* cited by examiner

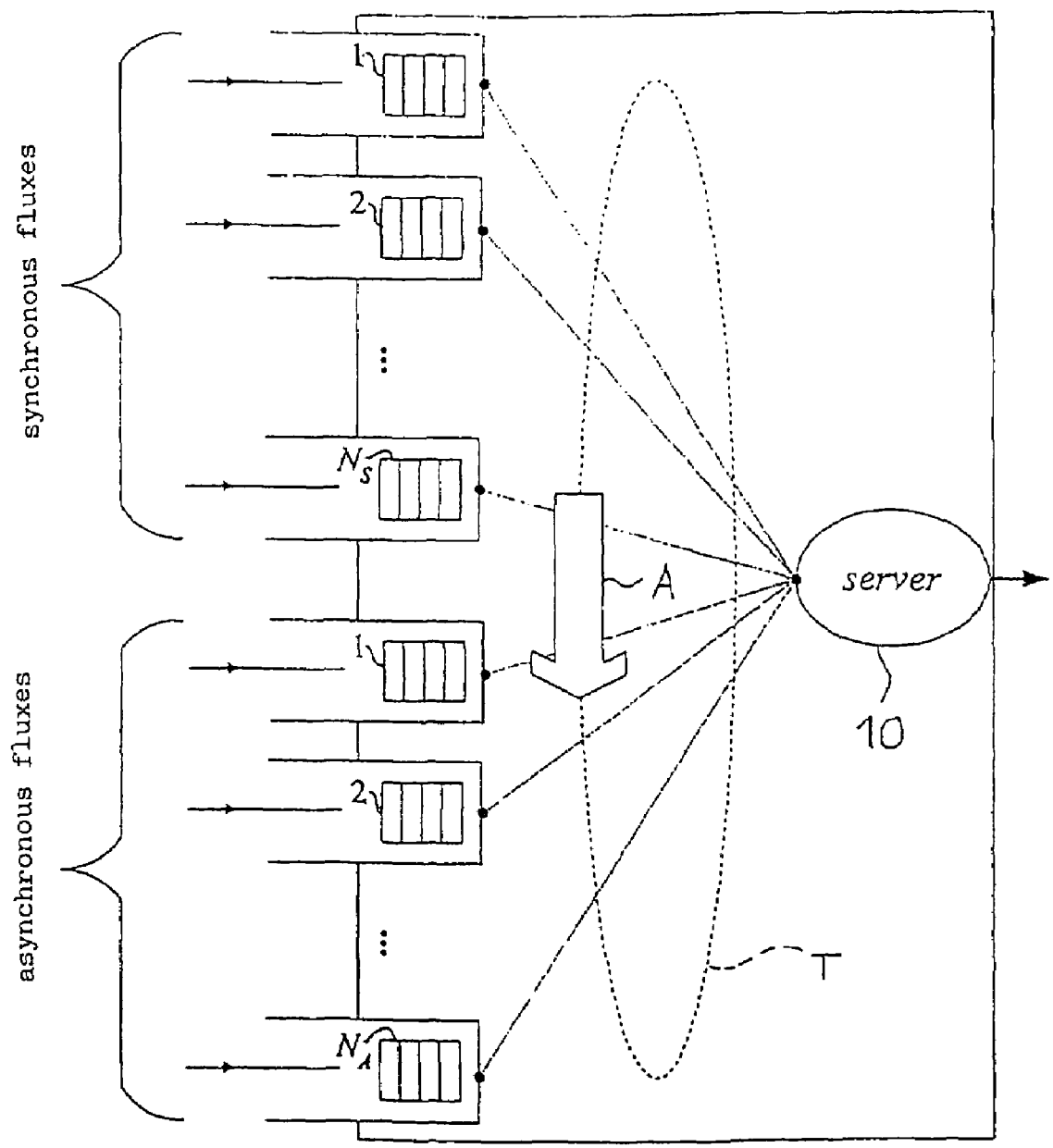

PROCEDURE AND SYSTEM FOR SCHEDULING A SHARED RECOURSE BETWEEN MULTIPLE INFORMATION PACKET FLOWS

This invention refers to the packet communication systems, and in particular to the scheduling criteria of a shared resource, i.e. the criteria used to select the packet to which the resource is to be assigned each time this occurs.

The solution given in the invention has been developed both for radio resource scheduling (e.g.: MAC level scheduling), and for the scheduling of computational and transmissive resources in the network nodes (e.g.: flow scheduling with different service quality on Internet Protocol router (IP). The following description is based especially on the latter application example, and is given purely as an example and does not limit the scope of the invention.

For several years now, the widespread application and rapid evolution of the packet networks have given rise to the problem of integrating the traditional services offered by the old generation packet networks (electronic mail, web surfing, etc.) and the new services previously reserved for circuit switching networks (real time video, telephony, etc.) into the so-called integrated services networks. The integrated services networks must therefore be able to handle traffic flows with different characteristics and to offer each type of flow a suitable service quality, a set of performance indexes negotiated between user and service provider, which must be guaranteed within the terms agreed upon.

One of the key elements in providing the service quality requested is given by the scheduling implemented on the network nodes, i.e. by the criteria with which the packet to be transmitted is selected each time from those present on the node; this criteria must obviously match the following characteristics:

flexibility, in the sense of capacity to provide different types of services;

simplicity, a characteristic that makes it possible to use in environments that require high transmission speeds and the handling of numerous transmission flows; and efficiency in the use of the shared resource (e.g. the transmissive means).

This invention, having the characteristics referred to in the claims that follow, initially consists of a scheduling procedure that can satisfy the aforesaid requirements. Another aspect of the invention is that it also relates to the relative system.

In particular, the solution given in the invention is able to provide different types of service at a low computational cost, and can therefore be applied to computer networks that must guarantee its users quality of service, like the IP networks in intserv or diffserv techniques. The solution given in the invention also applies to the scheduling systems of radio resources such as MAC level scheduling algorithms (W-LAN systems, third-generation mobile-radio services).

In particular, the solution given in the invention guarantees the bit rate of the various flows, the maximum queueing delay and the maximum occupation of the buffers of each flow for synchronous traffic.

In its current preferred form of actuation, the solution given in the invention is capable of providing the following characteristics:

flexibility: the solution given in the invention offers two different types of service, rate-guaranteed (suitable for synchronous flows) and best-effort (suitable for asynchronous flows), and is therefore able to function in service integration networks;

isolation of flows: the special architecture makes it possible to isolate the transmission flows, i.e. it makes the service offered to a single-flow independent from the presence and behaviour of other flows;

low computational complexity: the number of operations necessary to select the packet to be transmitted each time is independent from the number of transmission flows present, and therefore the system has one computational complexity O(1); this property makes the system particularly suitable for environments in which the transmission speeds and the number of flows are high;

adaptability: the solution given in the invention is able to handle a change in the operating parameters (e.g. the number of flows present) by redistributing its resources without having to resort to complex procedures; and analytic describability: a complete analytic description of the system's behaviour is provided; this makes it possible to relate the service quality measurements to the system parameters.

The following description of the invention is given as a non-limiting example, with reference to the annexed drawing, which includes a single block diagram FIGURE that illustrates the operating criteria of a system working according to the invention.

A scheduling system as given in the invention is able to multiplex a single transmission channel into multiple transmission flows.

The system offers two different types of service: a rate-guaranteed service, suitable for transmission flows (henceforth, h synchronous flows with h=1, 2, . . . , $N_S$) that require a guaranteed minimum service rate, and a best-effort service, suitable for transmission flows (henceforth, i asynchronous flows, with i=1, 2, . . . , $N_A$) that do not require any guarantee on the service rate. The system provides the latter, however, with a balanced sharing of the transmission capacity not used by the synchronous flows.

The traffic from each transmission flow input on the node is inserted in its queue (synchronous or asynchronous queues will be discussed later) from which it will be taken to be transmitted. The server 10 visits the queues in a fixed cyclic order (ideally illustrated in the FIGURE of the drawings with trajectory T and arrow A), granting each queue a service time established according to precise timing constraints at each visit.

System operation as given in the invention includes initialisation followed by the cyclic queue visit procedures. These procedures will be discussed later.

Initialisation

First of all, it is necessary to give the system the information relating to the working conditions: how many synchronous flows there are (in general: $N_A$), what the transmission rate requested by each of these flows is, how many asynchronous flows there are, the expected rotation time (TTRT), i.e. how long a complete cycle during which the server visits all the queues once is to last.

On the basis of this information, the system parameters can be defined:

each synchronous flow h, h=1 . . . $N_S$, is associated, according to an appropriate allocation policy, to a variable $H_h$ (synchronous capacity) that measures the maximum time for which the traffic of a synchronous flow can be transmitted before relinquishing the token. The possible allocation policies will be described below;

each asynchronous flow i i=1 . . . $N_A$ is associated to two variables, lateness (i) and last_token_time(i); the first variable stores the delay that must be made up for the asynchronous queue i to have the right to be served; the second variable stores the instant in which the server visited the asynchronous queue i in the previous cycle. These variables are initialised to zero.

The system clock is also started; supposing that the reading of the current_time variable gives the current time with the desired precision, the queue scanning will start.

Visit to a Generic Synchronous Queue h, with h=1 . . . $N_S$

A synchronous queue can be served for a period of time equal to its maximum synchronous capacity $H_h$, determined during the initialisation stage. If the queue being served is empty, the server will move on to visit the next queue, even if the $H_h$ time has not passed.

Visit to a Generic Asynchronous Queue i, with i=1 . . . $N_A$

An asynchronous code can be served only if the server's visit occurs before the expected instant. To calculate whether the server's visit is in advance, subtract the time that has passed between the previous visit and the accumulated delay lateness(i) from the expected rotation time TTRT. If this difference is positive, it gives the period of time for which the asynchronous queue i has the right to be served, and in this case the lateness variable (i) is reset. If the difference is negative, the server is late, and therefore the queue i cannot be served; in this case, the delay is stored in the lateness variable (i). The same applies to the asynchronous queues; if the queue being served is empty, the server will move on to visit the next one even if the previously calculated service time has not yet passed completely.

The pseudocode illustrated below analytically describes the behaviour of a system as given in the invention which proposes the scheduling of $N_A$ asynchronous flows and $N_S$ synchronous flows simultaneously ($N_A$ and $N_S$ must be non-negative integers). It should be supposed that each synchronous flow h, h=1 . . . $N_S$ requires a service rate equal to $f_h$ times the capacity of the output channel ($0 \leq f_h \leq 1$), and that the sum of the service rates requested by the synchronous flows does not exceed the capacity of the channel itself $$\left( \sum_{h=1}^{N_S} f_h \leq 1 \right).$$

Initialisation
fetch_parameters ($N_S$, $f_1$ . . . $f_{Ns}$, $N_A$, TTRT);
select_parameters ($H_1$ . . . $H_{Ns}$);
for (i=1 to $N_A$) {lateness(i)=0; last_token_time (i)=0;}
current_time=0;
Start_Cycle;
   Visit to a Generic Synchronous Queue h, with h=1 . . . $N_S$:
Transmit_for_a_Time ($H_h$);
Next_Visit;
   Visit to a Generic Asynchronous Queue i, with i=1 . . . $N_A$:
t=current_time;
temp=TTRT−latenesess(i)−(t)−last_token_time (i));
if (temp>0)
   {Transmit_for_a_Time (temp);
   lateness(i)=0;}
else
   lateness (i)=−temp;
last_token_time (i)=t;
Next_Visit;

The ability to guarantee that the synchronous flows receive a minimum service rate that is not less than that requested depends on whether the synchronous capacities $H_h$, h=1 . . . $N_S$ have been selected correctly. In the system given in the invention, the $H_h$, h=1 . . . $N_S$ are selected in proportion to the value of the expected rotation time TTRT:

$$H_h = TTRT \cdot C_h$$

The values of the proportionality constant $C_h$ can be selected according to one of the following two schemes:

local scheme: $C_h = f_h$ global scheme: $C_h = \dfrac{N_A \cdot f_h}{N_A + 1 - \sum_{j=1}^{N_S} f_j}$ The applicability of the global scheme is naturally linked to the presence of at least one asynchronous flow.

If the $H_h$ are calculated following one of the aforementioned schemes, each synchronous flow is served at a rate that is no less than $r_h$ times the capacity of the channel, with $r_h$ given by the following expression:

$$r_h = \dfrac{[N_A + 1] \cdot C_h}{N_A + \sum_{j=1}^{N_S} C_j} \geq f_h$$

and it can be guaranteed that, given any interval of time [$t_1$, $t_2$) in which the generic synchronous queue h is never empty, the service time $W_h(t_1,t_2)$ received by the h queue in [$t_1$, $t_2$), the following inequality will occur:

$$0 < r_h \cdot (t_2-t_1) - W_h(t_1, t_2) \leq \Lambda_h < \infty, \; \forall t_2 \geq t_1, \; h=1 \ldots N_S \quad (1)$$

with:

$$\Lambda_h = C_h \cdot TTRT \cdot (2-r_h) > \min(2H_h, TTRT)$$

Relation (1) above establishes that the service provided by the system given in the invention to a synchronous flow h does not differ by more than $\Lambda_h$ from the service that the same flow would experience if it were the only owner of a private transmission channel with a capacity equal to $r_h$ times that of the channel handled by the scheduler as given in the invention. $\Lambda_h$ therefore represents the maximum service delay with respect to an ideal situation. Since $\Lambda_h$ is proportional to TTRT, TTRT can be selected to limit the maximum service delay.

The global scheme guarantees a better use of the transmission capacity of the channel with respect to the local scheme, in that under the same operating conditions it allocates a lower capacity to the synchronous flows, leaving a larger section of the band free for asynchronous flow transmissions.

On the other hand, the use of a global scheme envisages that all the $H_h$ parameters are recalculated each time the number of flows (synchronous or asynchronous) in the system changes; the use of a local scheme, however, means that the $H_h$ can be established independently from the number of flows present in the system.

The guarantee on the minimum service rate makes it possible to provide guarantees on the maximum buffer occupation (backlog) and on the maximum queuing delay for synchronous traffic if appropriate mechanisms for conditioning input traffic are used.

Assuming a composite leaky bucket is used as a traffic conditioning mechanism, consisting of n≧1 leaky bucket in cascade, and granting that each leaky bucket is characterised by a pair of parameters $(b_j, t_j)$, j=1 . . . n, where $b_j$ is the dimension of the leaky bucket (expressed in units of time), and $1/t_j$ is the filling rate of the leaky bucket, it is possible to define the following quantities:

$$T_j = \frac{b_j - b_{j+1}}{t_j - t_{j+1}} t_j t_{j+1}$$

$$B_j = \frac{b_j t_j - b_{j+1} t_{j+1}}{t_j - t_{j+1}}$$

where $b_{n+1}=0$ and $t_{n+1}=0$ are introduced for the sake of easy notation. We can suppose (without losing general aspects) that the following inequalities have occurred: $t_j > t_{j+1}$, $b_j > b_{j+1}$, $T_j > T_{j+1}$ for j=1 . . . n−1

Supposing that the generic synchronous flow k has guaranteed a rate equal to $r_k$, if the traffic sent by the synchronous flow k is limited by a composite leaky bucket with n stages described by the parameters $(b_j, t_j)$, j=1 . . . n, the following guarantees can be formulated.

If $r_k \geq 1/t_1$, then both the backlog and the queuing delay have an upper limit; in addition, if the single leaky bucket is marked with index i, we have: $1/t_i \leq r_k < 1/t_{i+1}$, i=1 . . . n:

the queuing delay is limited at the top by:

$$d_k = (\Lambda_k + B_i)/r_k - T_i$$

if $\Lambda_k/r_k \leq T_i$, the backlog is limited at the top by: $q_k = \Lambda_k + B_i - r_k \cdot T_i$ if $\Lambda_k/r_k > T_i$, the backlog is limited at the top by:

$$q_k = \frac{\Lambda_k}{t_h \cdot r_k} + b_h,$$

where h is the leaky bucket that checks the inequality $T_h \leq \Lambda_k/r_k < T_{h-1}$, h=1 . . . i$^1$.

$T_0 = \infty$ has been used in the above description for the sake of easy notation.

Obviously the details of how this is done can be altered with respect to what has been described, without however, leaving the context of this invention.

The invention claimed is:

1. A method of scheduling a service resource shared between multiple information packet flows, said flows generating respective associated queues and being served by the attribution of a token, this plurality of flows including synchronous flows requiring a guaranteed minimum service rate and asynchronous flows destined to exploit the service capacity of said resource left unused by the synchronous flows, comprising the steps of:

providing a server that visits the queues associated with said flows in successive cycles and and that determines a time value of expected rotation that in turn identifies an amount of time necessary for the server to complete a visit cycle to the respective queues;

associating with each synchronous flow a respective synchronous capacity value indicative of the maximum amount of time for which a synchronous flow can be served before relinquishing the token;

associating with each synchronous flow (i) a first respective delay value that identifies a value that must be made up for the respective queue to be served, and a second value that indicates an instant in which the server visited the respective queue in the previous cycle, determining for said respective queue an amount of time that has passed since the previous visit of the server, serving each queue associated to a respective synchronous flow for a maximum service time equal to said respective value of synchronous capacity, and serving each queue associated to a respective asynchronous flow only if the server's visit occurs before an expected instant, said advance being determined as the difference between said expected rotation time value and an amount of time that has passed since the server's previous visit and any accumulated delay; wherein if positive, this difference defines a maximum service time for each said queue.

2. The method defined in claim 1 wherein, if the queue is empty when the server visits it, causing the server to visit a subsequent queue even before a relative maximum service time has passed.

3. The method defined in claim 1 wherein, when said difference is negative, each said queue associated to a respective asynchronous flow (i) is not served and the value of said difference is accumulated with said delay.

4. The method defined in claim 1 wherein said first respective value and said second respective value are initialized to zero.

5. The method defined in claim 1 wherein said respective synchronous capacity value is determined in proportion to said expected rotation time value.

6. The method defined in claim 5 wherein said respective synchronous capacity value is determined in proportion to said expected rotation time value according to a respective first proportionality factor selected in relation to a respective second proportionality factor between the service rate requested by the respective synchronous flow and the service capacity of said shared resource.

7. The method defined in claim 6 wherein the respective first proportionality factor is selected equal to the respective second proportionality factor.

8. The method defined in claim 6 wherein the second proportionality factors are selected on the basis of the following formula $$C_h = \frac{N_A \cdot f_h}{N_A + 1 - \sum_{j=1}^{N_S} f_j}$$

where:

j is an ordinal number, $f_j$ stands for said respective proportionality factor relating to the j-the synchronous flow, and $N_A$ is the number of said asynchronous flows.

9. A system for the scheduling of a service resource shared between multiple information packet flows, said flows generating respective associated queues and being served by the attribution of a token; this plurality of flows includes synchronous flows requiring a guaranteed minimum service rate and asynchronous flows destined to exploit the service capacity of said resource left unused by the synchronous flows, said system comprising a server that is able to visit the queues associated, to said flows in successive cycles; the system being configured to perform the following operations:

determine an expected rotation time value which identifies an amount of time necessary for the server to complete a visiting cycle of said, respective queues, associate with each synchronous flow (h) a respective synchronous capacity value ($H_h$) indicative of the maximum amount of time for which a respective synchronous flow can be served before relinquishing the token, associate with each asynchronous flow a first respective delay value that identifies the delay that must be made up for the respective queue to be served, and a second respective value that indicates an instant in which the server visited the respective queue in the previous cycle, determining for said respective queue, an amount of time that has passed since the previous visit of the server, serve each queue associated to a respective synchronous flow for a maximum service time equal to said respective value of synchronous capacity, and serve each queue associated to a respective asynchronous flow only if the server's visit occurs before the expected instant, said advance being determined as the difference between said expected rotation time value and an amount of time that has passed since the server's previous visit and any accumulated delay; if positive, this difference defines a maximum service time for each said queue.

10. The system defined in claim 9 wherein the server is configured in such a way that if the queue is empty when the server visits it, the server will move onto visit a subsequent queue even before the relative maximum service time has passed.

11. The system defined in claim 9 wherein, in the case in which said difference is negative, each said queue associated to a respective asynchronous flow (i) is not served by the server and the value of said difference is accumulated with said delay.

12. The system defined in claim 9 wherein said first respective value and said second respective value are initialized to zero.

13. The system defined in claim 9 wherein said respective synchronous capacity value is determined in proportion to said expected rotation time value.

14. The system defined in claim 9 wherein said synchronous capacity value is determined in proportion to said expected rotation time value according to a proportionality factor selected in relation to the respective proportionality factor between the service rate requested by the respective synchronous flow and the service capacity of said shared resource.

15. The system defined in claim 14 wherein said proportionality factor is selected on the basis of the following formula $$C_h = \frac{N_A \cdot f_h}{N_A + 1 - \sum_{j=1}^{N_S} f_j}$$

where:
$j$ is an ordinal number,
$f_j$ stands for said respective proportionality factor relating to the j-the synchronous flow, and
$N_A$ is the number of said asynchronous flows.

* * * * *